United States Patent
Rowan et al.

(10) Patent No.: US 8,070,606 B2
(45) Date of Patent: Dec. 6, 2011

(54) PROGRESSIVE STALL TIMER

(75) Inventors: Richard Thames Rowan, Redmond, WA (US); Eric Heutchy, Carnation, WA (US); Brian Ostergren, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 11/800,700

(22) Filed: May 7, 2007

(65) Prior Publication Data

US 2008/0277877 A1    Nov. 13, 2008

(51) Int. Cl.
A63F 13/00    (2006.01)
G06F 17/00    (2006.01)

(52) U.S. Cl. ............................................ 463/42; 463/16

(58) Field of Classification Search .................. 463/1, 9, 463/16, 25, 40–42; 273/434, 260, 242, 282.1; 368/96
See application file for complete search history.

(56) References Cited

U.S. PATENT DOCUMENTS

| | | | |
|---|---|---|---|
| 4,884,255 A * | 11/1989 | Fischer ............................. | 368/96 |
| 5,420,830 A * | 5/1995 | Camaratta et al. ............... | 368/96 |
| 6,368,218 B2 | 4/2002 | Angell, Jr. et al. | |
| 6,761,633 B2 | 7/2004 | Riendeau et al. | |
| 7,037,193 B1 * | 5/2006 | Kasparov et al. ................ | 463/17 |
| 2001/0034256 A1 | 10/2001 | Green | |
| 2003/0026172 A1 | 2/2003 | Eagle | |
| 2003/0060250 A1 | 3/2003 | Chan | |
| 2003/0119579 A1 * | 6/2003 | Walker et al. .................... | 463/20 |
| 2003/0228901 A1 * | 12/2003 | Walker et al. .................... | 463/25 |
| 2004/0065999 A1 * | 4/2004 | Syed et al. ...................... | 273/260 |
| 2004/0145114 A1 * | 7/2004 | Ippolito et al. ............ | 273/148 R |
| 2004/0204246 A1 * | 10/2004 | Halliburton et al. ............ | 463/42 |
| 2005/0221881 A1 | 10/2005 | Lannert et al. | |
| 2005/0227764 A1 * | 10/2005 | Cantu et al. ..................... | 463/37 |
| 2006/0061035 A1 | 3/2006 | Collins et al. | |
| 2006/0170158 A1 * | 8/2006 | MacIver et al. ................ | 273/242 |
| 2006/0287026 A1 * | 12/2006 | Mullen .............................. | 463/4 |

OTHER PUBLICATIONS

Dickey, et al., "Low Latency and Cheat-proof Event Ordering for Peer-to-Peer Games", Date: Jun. 18, 2004.
Yan, et al., "Richard Thames Rowan".

* cited by examiner

Primary Examiner — Masud Ahmed
(74) Attorney, Agent, or Firm — Alleman Hall McCoy Russell & Tuttle LLP

(57) ABSTRACT

A progressive stall timer is disclosed. For example, in one disclosed embodiment, a participant in an online turn-based social experience is provided with a time interval in which to take an action in a current turn. If the participant does not take an action in the current turn during the time interval, then the participant is provided a shortened time interval during which to take an action in a later turn. In this manner, the negative impact a stalling participant has on the experience is reduced each time the participant stalls.

17 Claims, 3 Drawing Sheets

PROGRESSIVE STALL TIMER

BACKGROUND

Many online social experiences, including but not limited to video games, shared art creation, debates, etc., are conducted in a turn-by-turn manner. In such settings, some participants may deliberately delay by refusing to make a move on their turn. This tactic is known as stalling. Stalling may be frustrating to other participants due to the disruption caused to the flow of the experience.

Various methods have been used to try to solve the problem of stalling. For example, one approach is to give participants the option to vote to eject a participant from the game, requiring majority or unanimous consent. Another approach is to employ a stall timer wherein, after a fixed period of time, other participants have an option to start a visible timer on a stalling participant, giving the stalling participant an additional fixed amount of time to finish a turn before a penalty is assessed against the stalling participant. Another approach employs a turn timer in which each participant has a known, visible fixed period of time to finish a turn. A similar concept is to utilize a chess-style timer in which each participant has a known, fixed amount of time to finish a game. Yet another approach employs a "three-strikes" system in which, after a fixed period of time has passed during a participant's turn, another participant or the host computer is able to call a "strike" on that participant. After three strikes have been called on the participant during a game, the participant is ejected.

While these approaches are each somewhat effective in controlling a stalling participant, they offer various disadvantages. For example, the use of the vote-to-eject approach requires multiple participants to agree. Likewise, visible timers utilize persistent, space-consuming user interface elements. Further, a visible timer allows a stalling participant to wait until just before turn time elapses before moving. Additionally, the use of timers may be too rigid an approach for a friendly online gathering where participants do not mind waiting on their friends occasionally.

SUMMARY

Accordingly, a progressive stall timer is described below in the Detailed Description. For example, in one disclosed embodiment, a participant in an online turn-based social experience is provided with a time interval in which to take an action in a current turn. If the participant does not take an action in the current turn during the time interval, then the participant is provided a shortened time interval during which to take an action in a later turn. In this manner, the negative impact a stalling participant has on the experience is reduced each time the participant stalls.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
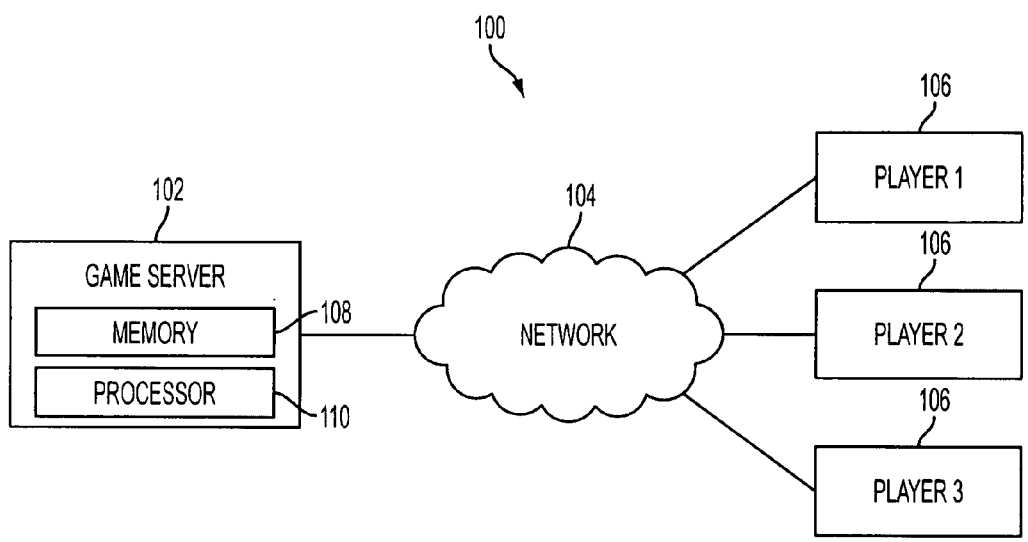
FIG. 1 shows an embodiment of an online turn-based social experience environment.

Prior to proceeding with a description of the various disclosed embodiments, a description of an exemplary online turn-based social experience environment in which the disclosed embodiments may be implemented or practiced is provided in FIG. 1. It will be appreciated that the embodiments described below may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, including but not limited to personal computers, servers, laptop computers, hand-held devices, cellular phones, and other micro-processor-based programmable consumer electronics. Further, while specific embodiments are described herein in the context of an online gaming environment, it will be appreciated that the concepts disclosed may be extended to any other suitable turn-based online social experience, including but not limited to debates, shared art creation, and other such experiences, and that the term "player" as used herein may refer to a participant in any such experience.

Continuing with FIG. 1, an embodiment of an online gaming environment 100 is shown. Online gaming environment 100 comprises a game server 102 connected to a network 104. Game server 102 includes one or more game programs stored in memory 108 on the game server, which are executable by processor 110 on the game server to present one or more video games to a plurality of players 106. The games presented to players 106 may be multi-player games in which players 106 participate in a single game and take turns making moves or taking other actions in the game. Examples of such games include, but are not limited to, card games, board games, role-playing games, etc. While three players are shown in the depicted embodiment for the purpose of example, it will be appreciated that any suitable number of players may connect to game server 102 to play a multi-player game together. Further, the term "game server" is used herein to refer to any computing device that hosts a multi-player game, whether the device is a network server, a network peer, or any other suitable computing device. Additionally, while described in the context of a client-server environment, the embodiments and concepts disclosed herein may also be used in a peer-to-peer environment, or in any other suitable computing environment.

Each player's enjoyment of an online turn-based game is directly impacted by the actions of other players. Where one player repeatedly delays or stalls during turns, that player can ruin the game experience for other players. The use of a stall timer that gives each player a fixed amount of time to take an action in a turn may lessen the impact of the stalling player on the game, but still provides the stalling player with the opportunity to wait until just before the timer runs out before making a move during each turn. It will be understood that the term "turn" may refer to any aspect of game play in which game progress depends upon one or more players taking an action. In some embodiments, each "turn" may be played by only a single player, while in other embodiments, a "turn" may be played by a plurality of players, all of whom take an action before the turn ends.

Figure 2:
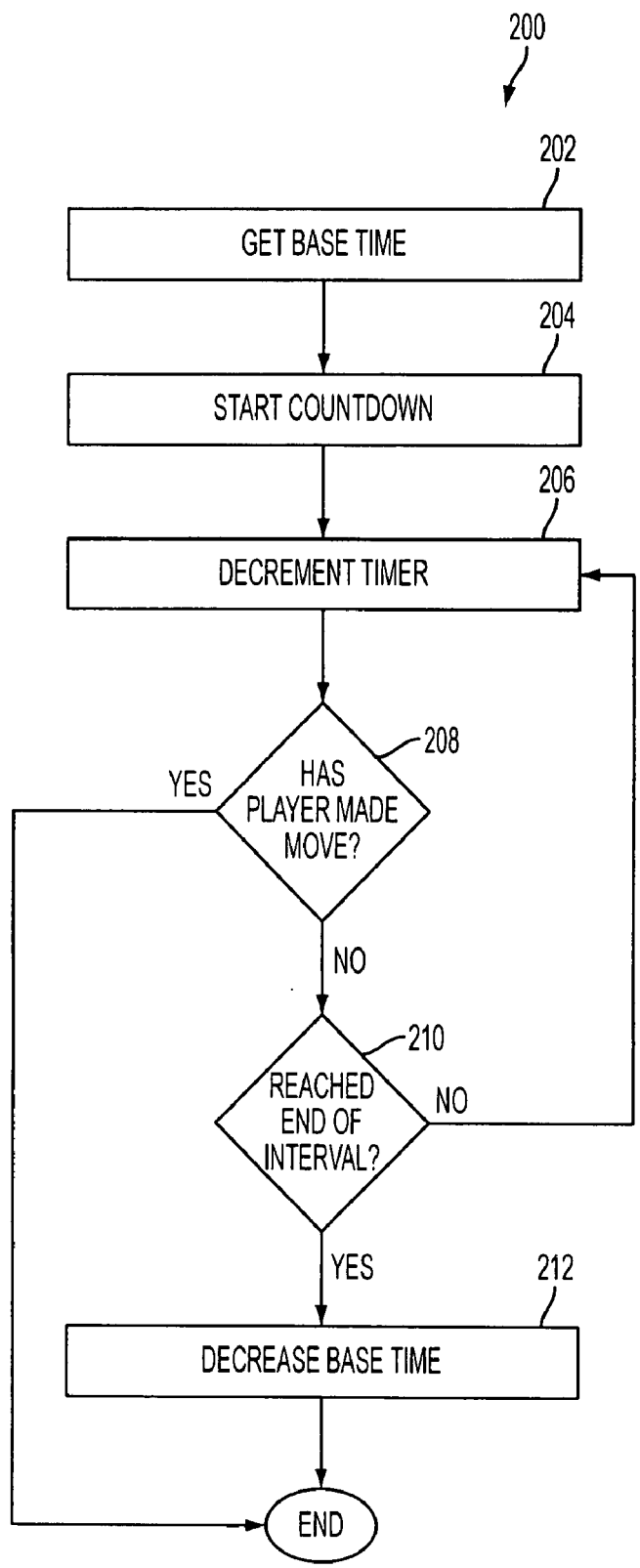
FIG. 2 shows a process flow depicting a first embodiment of a progressive stall timing method.

FIG. 2 shows a flow diagram of an embodiment of a progressive stall timing method 200 that may help to reduce the impact of a repeatedly stalling player compared to a fixed stall timer. As described in more detail below, method 200 progressively reduces the amount of time a player has to complete a future turn each time a player stalls beyond a predetermined interval of time during a current turn. In this manner, the impact of a player that repeatedly stalls is reduced each time the player stalls.

Method 200 first comprises obtaining, at 202, a base time for a player at the beginning of that player's turn. Next, method 200 comprises, at 204, starting the countdown of the timer, and, at 206, decrementing the timer after the countdown is started. Next, method 200 comprises, at 208, determining whether a player has made a move or taken another turn-ending action. If the player has moved, then method 200 ends, and the base time for that player is not adjusted. On the other hand, if the player has not moved, then method 200 next comprises, at 210, determining whether the player has reached the end of the time interval allotted to that player to complete the current turn. If not, the timer continues to be decremented at 206, and method 200 loops until the player has made a move or until the end of that player's time interval is reached. If the end of the time interval is reached before the player has made a move, then method 200 comprises, at 212, decreasing that player's base time for the player's next move in the game so that the player has a shortened time interval during which to complete future moves. Further, an additional penalty may be assessed for exceeding the time interval, as described in more detail below. It will be appreciated that the terms "take an action," "make a move," and the like are used herein to signify any turn-ending action that a player may take, and are not intended to signify any specific action, such as physically moving a card or a piece to a different location on a display.

The base time obtained at 202 is the time interval allotted for each player to finish a turn in a game. In some embodiments, the base time initially may be equal for each player in a game at the beginning of the game, and may be reset to this value at the beginning of each game. In this manner, any stalling behavior performed in past games is not assessed against a player in the current game.

Any suitable amount of base time may initially be allotted. For example, the initial base time may be chosen such that players playing at a reasonable pace do not feel rushed to play a turn. Further, some excess amount of time above this reasonable time may also be allotted in the initial base time so that players may take some extra time and/or thought during a move without exceeding the allotted time interval. This amount of time may vary between games. For example, some simple card games may have relatively short base times allotted (for example, on the order of 20-40 seconds), while more complex games such as chess may have longer base time allotments (for example, on the order of 3-5 minutes). In yet other embodiments, the players may have the ability to select a base time. For example, where a game has a player that acts as host, the host player may select the base time. Alternatively, all players participating in a game may decide on an initial base time before beginning play or during play.

In other embodiments, the base time obtained for a player at 202 may be based upon that player's prior stalling behavior. For example, information related to a player's past stalling behavior may be saved in a profile of the player on game server 102. In this manner, the base time allotted to that player in a game may be shorter than the base time allotted to other players due to that player's prior stalling behavior. In such embodiments, a mechanism may be provided to allow a player with a reduced base time to recapture lost base time. For example, lost base time may be recaptured by considering only recently played games in determining the base time, or by tracking a ratio of the number of times a player has stalled during a turn compared to the number of total turns the player has played in a game. In either of these examples, a player may recapture time by ceasing the use of stalling tactics in later-played games, or even intra-game.

Prior stalling behavior may also be taken into account when determining the amount by which a player's time is to be reduced for a stalling violation. For example, all players initially may be allotted the same initial base time. However, upon the occurrence of a stalling violation, the reduction in base time assessed to the player may be increased compared to other players based upon historical stalling attempts. As a specific example, in one embodiment of this concept, a total number of prior games played (for example, up to 100 maximum) may be stored, along with the total number of the stored prior games in which the player committed a stalling violation. From these two numbers, a stall ratio may be calculated that represents a percentage of the last 100 games played in which the player stalled. This percentage could then be applied as an historical stalling penalty, with the option of capping it at some percentage or fixed value. As a more specific example, each player is allotted an initial turn length of 30 seconds. After stalling the first time in this game, players without a sufficiently high stall ratio have their times reduced 20% to 24 seconds. However, for a player who is a chronic staller with a stall ratio of 80%, the time reduction may be greater than 6 seconds. For example, the percentage may be applied directly, immediately reducing turn length by 80% of the total initial time in addition to the normal 20% reduction (giving the player zero seconds per turn before other players can force play), or a cap, such as a 50% cap, could be applied to their historical stalling percentage, which would reduce their turn by an additional 15 seconds, leaving the player with a 9 second turn length after their first offense. It will be appreciated that these specific initial base times and time reduction amounts are set forth merely for the purpose of example, and are not intended to be limiting in any sense.

Continuing with FIG. 2, when a player exceeds the allotted time interval during a turn, the base time for that player may be decreased by any suitable amount. For example, in some embodiments, the base time for the player may be reduced by a fixed percentage each time the player exceeds the allotted time interval for a turn. As a more specific example, in a specific card game, a player's initial base time may be 30 seconds, and the player's base time may be decreased by 20% each time the player fails to move within the base time interval. Therefore, if the player fails to move within 30 seconds, then the base time may be reduced to 24 seconds for the player's later turns in the game. This shortened base time may remain that player's base time unless the player exceeds this shortened time interval in a later turn. Then, if the player exceeds this time interval during a later turn, the player's base time may be reduced to 19.2 seconds for the next turn. In this manner, each time the player waits too long to take an action during a turn, the amount of time the player has to take an action during a turn is progressively reduced for later turns. In alternate embodiments, a fixed amount of time may be removed from the base time each time a player exceeds that turn's base time.

As mentioned above, players may be allowed to recapture lost time in some embodiments. For example, in one embodiment, each player may be awarded a small increase in base time each turn. Further, the penalty assessed for a stalling violation may be larger than the amount of time gained each turn. Therefore, a player that stalls may be able to recover the lost base time over a number of turns, but any additional stalling violations would quickly reduce that player's base time to a negligible amount. As a specific example, a game may be configured to initially allot a base time of 30 seconds to each player, may assess a 20 second penalty for a stalling violation, and may award a one second increase in base time for each turn completed within the allotted time. In such a game, a player that stalls twice would quickly be rendered only a minor annoyance to other players.

In embodiments where players can select an initial base time for a game, minimum time reduction thresholds and/or maximum time reduction caps may be used to provide limits on the possible reduction of a player's base time for a stalling violation. For example, where the base time is initially large, a fixed percentage reduction may cause too large a base time reduction penalty. As a specific example, where the players choose to have a five minute base time, the assessment of two 20% reductions in this base time against a player will reduce the base time to 3.2 minutes for that player. Such a large reduction in time may be considered overly harsh for the game. Thus, a maximum reduction cap may be used instead of the 20% reduction to reduce the time penalty for each stalling violation. Where a maximum reduction cap of thirty seconds is used, the player in the above example would have a base time of four minutes after two reductions. The player's base time may continue to be reduced by the cap amount for each stalling violation until the 20% reduction becomes a smaller reduction than the maximum reduction cap. It will be appreciated that the thirty second figure above is set forth merely for example, and that the maximum reduction cap may be any suitable amount of time. Further, the maximum reduction cap may be a fixed amount set during game development, or may be set by a game host or game players.

A minimum reduction threshold may be implemented in a similar manner. For example, where players can choose an initial base time and where the percentage reduction in the base time is relatively low, the use of a relatively short initial base time may result in reductions that are too low to deter stalling behavior, and/or that are too low to improve the game experience for non-stalling players. In this case, the use of a minimum time threshold reduction may help to ensure that the time reduction penalty is sufficient to help deter stalling and/or reduce the effects of stalling.

As mentioned above, an additional penalty besides the shortening of the base time may be assessed against a player who exceeds the allotted time interval during a turn. For example, in some embodiments, the game may be configured to automatically complete a turn for a player (i.e. perform a "forced move" for the player). In these embodiments, the automatic move may be configured to be a best possible move, a worst possible move, a null move (i.e. no move is made), or a random move, depending upon the primary intention of the penalty. For example, if the purpose of the penalty is to keep the game moving forward in a challenging manner for other players, the forced move may be a best possible move. Likewise, where the purpose of the penalty is to penalize the stalling player, the forced move may be a worst possible move or a null move. Further, a random move may be made to utilize uncertainty as a penalty.

In alternative embodiments, rather than automatically making a forced move upon the expiration of the time interval, other players may be enabled to elect to force a move for the stalling player when the time interval expires. For example, upon expiration of the time interval, a user interface element may appear on the player's screens that alerts the players that the time interval has expired, and may instruct the other players to make a specified input (for example, to push a specified button) to force a move for the stalling player. In these embodiments, the stalling player can still make a move after the expiration of the time interval as long as the player makes the move before another player elects to force a move. The use of an elective forced move may allow other players in the game not to penalize a player, for example, who had a legitimate reason for stalling, who may be a friend of and/or a regular game participant with the other players, etc. It will be appreciated that these are merely examples of penalties that can be assessed, and that any suitable additional penalty other than these may be assessed against a stalling player.

The countdown of the time interval during a turn may be displayed during the turn, or may be kept hidden. Displaying the remaining portion of the time interval allows a player to see how much time is left before the time reduction penalty is assessed. However, displaying the remaining time also may cause the players to feel rushed during a game, and therefore to enjoy the game less. Further, the timer may occupy valuable space on the game user interface, and shows deliberately stalling players just how much time is left before the player is assessed with a penalty. Keeping the timer hidden may allow players who are not stalling to enjoy the game without feeling rushed, and also may conserve space on the display. However, keeping the remaining time hidden also may cause a forced play to be made for a player without providing any warning beforehand.

Figure 3:
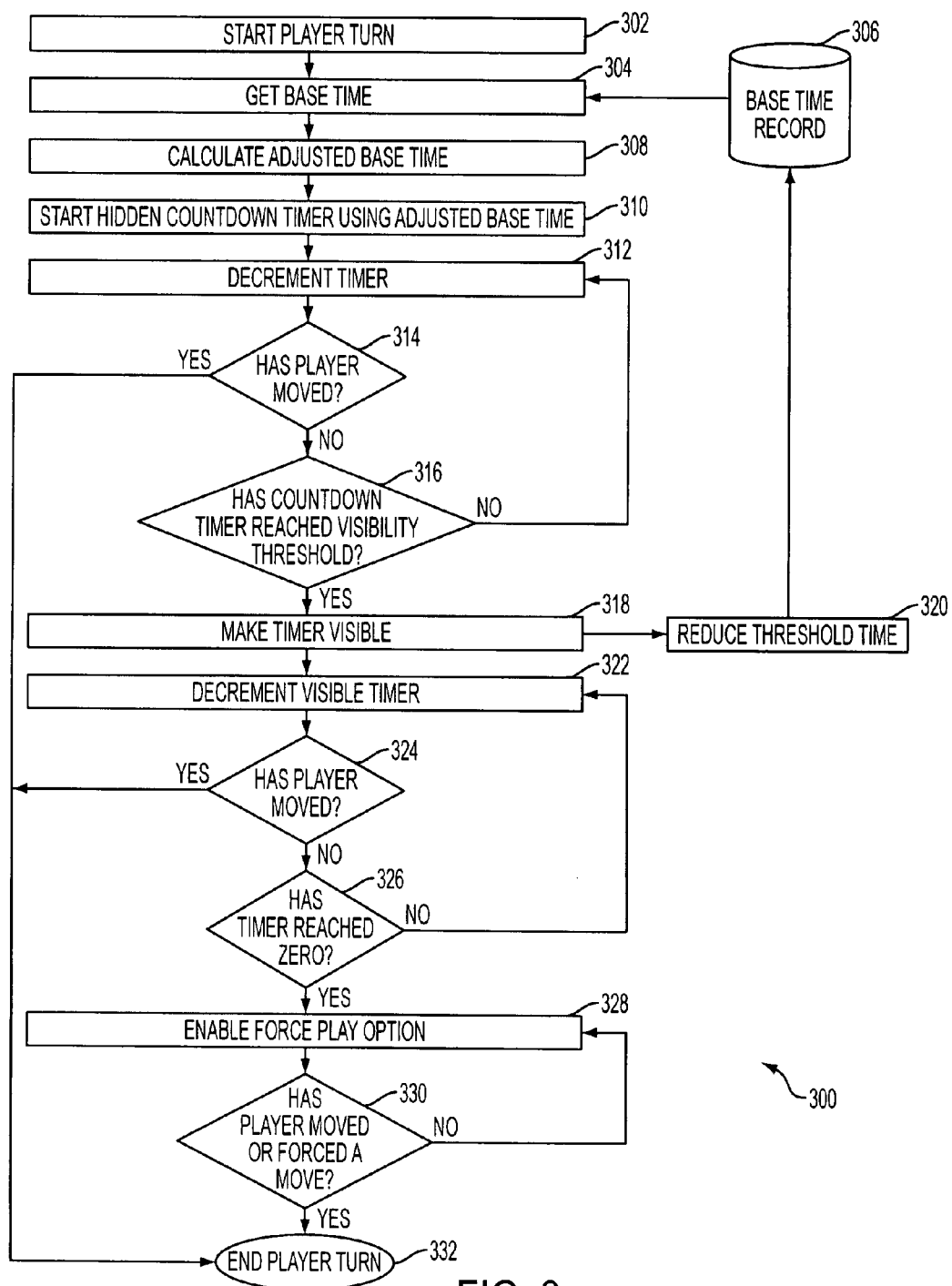
FIG. 3 shows a process flow depicting a second embodiment of a progressive stall timing method.

FIG. 3 shows an embodiment of a progressive stall timing method 300 which addresses these additional concerns. Briefly, method 300 hides the timer until a predetermined portion of the player's base time has passed. After this predetermined portion of the time interval has passed, the timer is revealed, and the time reduction penalty is assessed at this time. However, the player has additional time to complete the turn before a forced move penalty is assessed. In this manner, the time interval after which the base time reduction penalty is assessed is a portion of a greater total time interval that a player has before a forced move penalty is assessed. Displaying the timer close to the end of the total time interval exerts psychological pressure on the player to complete the turn, yet gives the player additional time to complete the turn before allowing a move to be forced by another player.

Continuing with FIG. 3, method 300 first comprises, at 302, starting a player turn and, at 304, acquiring a base time for that player turn from memory or database 306. Next, method 300 comprises, at 308, calculating an adjusted base time value. The adjusted base time value may be, for example, any base time value that is within a fixed percentage above or below the base time acquired at 304. As a specific example, where the base time for the player is 30 seconds, the adjusted base time value may be 30 seconds ± up to 10%, or anywhere in the range of 27-33 seconds. Further, the adjusted base time may be varied randomly each turn so that a player is never sure how much time is allotted for a given turn. The use of such an adjusted base time to provide a player's allotted time interval for a turn may make it difficult or impossible for a player to predict the time allotted for any turn, and therefore makes it more difficult to stall without having any penalties assessed.

After the adjusted base time is determined, the countdown for the turn starts at 310, and the timer is decremented at 312. Next, method 300 determines, at 314, whether a player has yet made a move. If so, then the player's turn ends, as indicated at 332. On the other hand, if the player has not yet made a turn, method 300 determines, at 316, whether the timer has reached a visibility threshold. This threshold corresponds to a predetermined portion of the player's allotted time interval at which a countdown timer is made visible to the current player and/or other players. If the threshold time has not yet been reached, then method 300 loops until either the player makes a move, or until the timer reaches the visibility threshold. The visibility threshold may be a fixed percentage of the allotted time interval for the turn such that the duration for which the countdown timer is displayed is shortened along with a decrease in a player's base time, or may be a fixed period of time that is not shortened with each decrease in a player's base time.

If the timer reaches the visibility threshold, method 300 next comprises, at 318, making the timer visible to the current player and/or other players. Further, the base time of the current player is decremented once the timer reaches the visibility threshold, as indicated at 320. Next, as timer continues to decrement at 322, method 300 involves, at 324, continuing to monitor whether a player has made a move, and, at 326, continuing to monitor whether the timer has run to zero. If a player makes a move before the timer runs to zero, then the turn ends without a move being forced. However, because the visibility threshold was surpassed, the player's base time is reduced for the duration of the game.

On the other hand, if a player fails to make a move before the visible timer runs to zero, then a forced play option is enabled at 328. In the depicted embodiment, during the forced play period, the play is not forced automatically upon the expiration of the timer. Instead, as indicated at 330, other players are given the option of initiating a forced move. This allows other players to elect to wait for the current player to make a move, for example, where the game is a friendly game and/or where the stalling player had a legitimate reason to stall. Method 300 continues to loop until either the player makes a move or another player forces a move. Once either of these actions takes place, the current turn ends, as indicated at 332, and method 300 begins again for the next player's turn. While method 300 gives other players the option of initiating a forced move, method 300 could also automatically force a move upon expiration of the timer.

Due to the progressive shortening of the base time for a player that repeatedly stalls, the persistent stalling player may quickly become only a minor annoyance to other players' enjoyment of the game. While disclosed in the context of an online game environment, it will be appreciated that the concepts and features described herein may also be used in a local console environment, a local personal computing environment, or in any other suitable video game environment.

It will further be appreciated that the specific configurations and/or approaches described herein are exemplary in nature, and that these specific embodiments or examples are not to be considered in a limiting sense, because numerous variations are possible. Various acts illustrated may be performed in the sequences illustrated herein, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating an online turn-based multi-player social experience executable via a processor on a server computing device, the method comprising:
   acquiring from memory on the server computing device a base time interval allotted for a participant to take an action in a current turn;
   providing the base time interval to the participant in the current turn; and
   if the participant does not take an action in the current turn during the base time interval, then shortening the base time interval stored in memory on the server computing device to form a shortened base time interval and, in a later turn, acquiring from memory on the server computing device the shortened base time interval in which to take an action in the later turn and providing the shortened base time interval to the participant in the later turn instead of providing the base time interval;
   wherein the shortened base time interval comprises a random value within a fixed percentage range of the base time interval.

2. The method of claim 1, further comprising progressively shortening the base time interval each time the participant fails to take an action in a turn before expiration of the base time interval.

3. The method of claim 1, wherein the base time interval is shortened by a fixed percentage each time the participant fails to take an action in a turn before expiration of the base time interval.

4. The method of claim 3, wherein the base time interval is shortened by a minimum threshold amount if shortening the base time interval by a fixed percentage would result in the base time interval being shortened by less than the minimum threshold amount.

5. The method of claim 3, wherein the base time interval is shortened by a maximum cap amount if shortening the time interval by a fixed percentage would result in the base time interval being shortened by greater than the maximum cap amount.

6. The method of claim 1, wherein the base time interval is a portion of a longer total time interval for taking an action during a turn, and further comprising displaying a timer to the participant after expiration of the longer total time interval to indicate an amount of the base time interval remaining for the participant to take an action before a penalty is assessed against the participant.

7. The method of claim 6, wherein the penalty comprises automatically taking an action for the participant after expiration of the timer.

8. The method of claim 6, wherein the penalty comprises not allowing the participant to take an action in the current turn.

9. The method of claim 1, further comprising increasing the base time interval for a later turn if the participant takes an action in the current turn during the base time interval.

10. On a server computing device comprising memory and a processor, a method of operating an online turn-based multi-player game, the method comprising:
   from the memory on the server computing device, acquiring a total time interval in which to play a current turn;
   providing the total time interval to a participant;
   decrementing a timer for a predetermined portion of the total time interval during the current turn while hiding the timer from the participant; and
   if the participant does not take an action within the predetermined portion of the total time interval, then not hiding a remaining portion of the total time interval from the participant, shortening the total time interval for playing a turn stored in memory on the server computing device to form a shortened total time interval, and, in a later turn, providing to the participant the shortened total time interval in which to play the later turn.

11. The method of claim 10, further comprising progressively shortening the total time interval each time the participant fails to take an action in a turn during the predetermined portion of the total time interval.

12. The method of claim 11, wherein the total time interval is shortened by a fixed percentage each time the participant fails to take an action in a turn before expiration of the total time interval.

13. The method of claim 10, further comprising assessing a penalty against the participant if the participant does not play the current turn within the total time interval.

14. The method of claim 10, wherein the total time interval comprises a base time, and further comprising varying the total time interval within a preselected range of times adjacent to the base time such that the total time interval has different times in different turns.

15. A computing device, comprising:
  memory;
  a processor; and
  computer-readable instructions stored in memory and executable by the processor to present a turn-based experience to a plurality of participants in which the participants take turns performing actions in the experience, to provide each participant a time interval for taking an action during a turn, and to progressively shorten the time interval provided to a selected participant each time the selected participant exceeds the time interval before taking an action during a turn, wherein the time interval comprises a base value, and further comprising instructions executable to vary the time interval within a preselected range of values adjacent to the base value such that the time interval has different values in different turns.

16. The computing device of claim 15, wherein the instructions are executable to shorten the time interval by a fixed percentage each time the selected participant fails to take an action in a turn before expiration of the time interval.

17. The computing device of claim 15, wherein the time interval is a portion of a longer total time interval for taking an action during a turn, and further comprising instructions executable to display a timer to the selected participant after expiration of the time interval to indicate an amount of the longer total time interval remaining for the selected participant to take an action before a penalty is assessed against the selected participant.

* * * * *